Sept. 6, 1938. W. J. FINNEGAN 2,129,572
MEANS FOR FREEZING AND PRESERVING COMESTIBLES
Filed Feb. 21, 1935
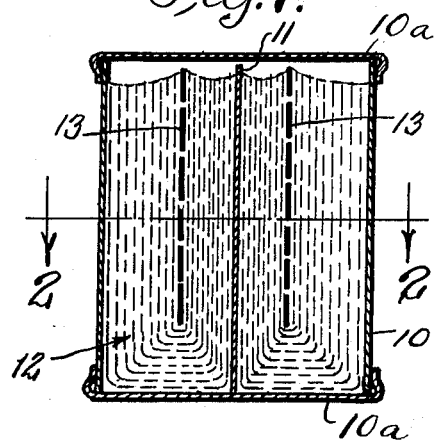
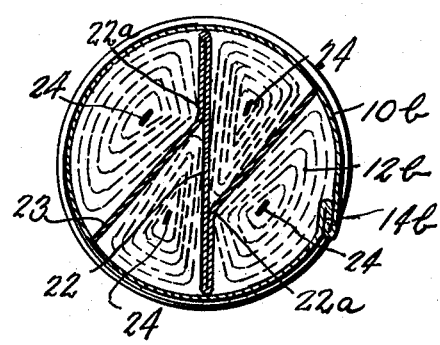
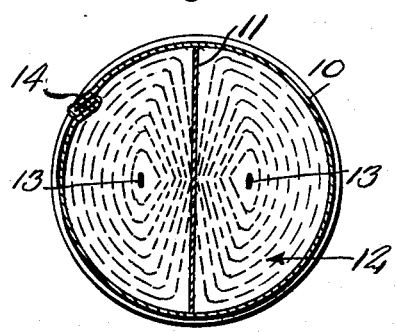
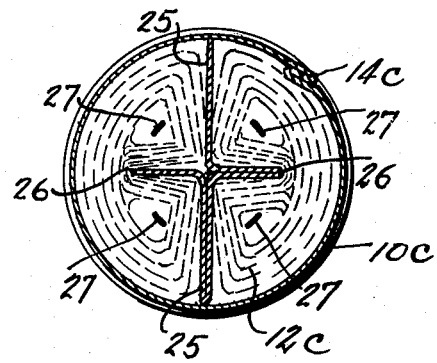
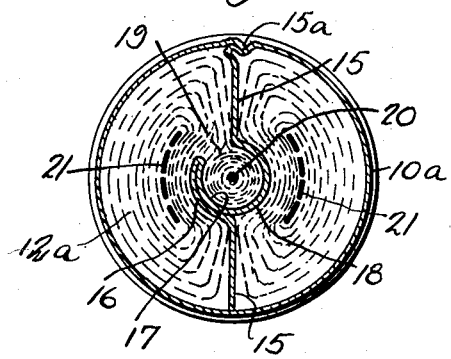
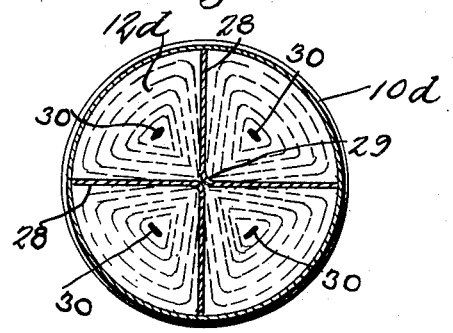
Inventor
W. J. Finnegan.
By
Attorney.

Patented Sept. 6, 1938

2,129,572

UNITED STATES PATENT OFFICE 2,129,572

MEANS FOR FREEZING AND PRESERVING COMESTIBLES

William J. Finnegan, Hollywood, Calif.

Application February 21, 1935, Serial No. 7,650

1 Claim. (Cl. 62—1)

This invention relates to certain new and useful improvements in the means for freezing and preserving comestibles.

The primary object of this invention resides in the method and means for rapidly freezing comestibles and other materials subjected to a similar treatment with a view of simplifying the method and rendering the same more economical and efficient.

Another and important object of this invention is to divide the unfrozen core formation ordinarily developed in the center of fruit juices and the like during the process of freezing in two or more separate unfrozen cores before final solidification thus minimizing the concentration of substances having a lower freezing temperature than the optimum freezing temperature required to solidify the material being treated, thereby improving the quality and appearance of the substance being treated and rendering the process more economical and efficient.

A further and important object of this invention is to reduce to a minimum the thickness of solidified substances accumulated on the available heat transferring surfaces of a container, as freezing progresses by the use of the novel means disclosed herein and thereby minimizing the insulating effect of the solidified substances resulting in more efficient and economical operation.

A further object of this invention is to minimize the coarse texture, discoloration and lack of uniform appearance developed in the center or core of a material being frozen thereby improving the quality and appearance of a material so treated.

A still further and important object of this invention is to provide a very effective means for accelerating heat transfer as required for defrosting a frozen comestible by the use of the novel means herein disclosed and thereby rendering the defrosting operation more efficient.

It is generally known that the thickness of a substance to be frozen determines the time required to completely solidify such substance with all other conditions equal, and the time required to freeze a substance varies approximately as the square of the thickness of such substance, other factors remaining constant. It is further known that the quality and appearance of frozen comestibles are dependent upon the time required to freeze and the temperature of the heat transferring vehicle used to freeze the comestible, furthermore the unfrozen core formation occurring in the center of a mass of material being treated as freezing progresses frequently forms a concentration having a freezing temperature below the optimum freezing temperature of the comestible being treated thus requiring a lower temperature to completely solidify the comestible and concentrated substance. This condition is known to cause injury to the comestible and is very uneconomical to maintain, furthermore the frozen core surrounding the final point of solidification in a container of frozen comestibles frequently has a very coarse texture, lacks uniform appearance and is discolored due to the relative slow freezing of the core and the freezing out of substances having a lower freezing point than the water present in the comestible. The slow freezing of the core is not wholly due to the formation of concentrated substances within the core but also due to the insulating effect of the frozen substances surrounding the core and formed on the heat transferring surfaces of the container. This insulating effect greatly retards heat transfer as the thickness of the frozen substance increases.

It is known that it is not new to divide a container through the use of partitions for the purpose of shaping a desired form or mold of solidified material and that it is not new to construct a container or a divider to fit within a container for the purpose of forming two or more cells in which two or more materials may be separated within the container but the application of the method and means herein disclosed for rapidly transferring heat from or to the approximate center of comestibles being treated within a container, provide improvements in the art heretofore unknown.

With the above and other objects in view that will become apparent as the nature of the invention is better understood, the same consists in the novel method and means hereinafter more fully described, shown in the accompanying drawing and claimed.

In the drawing:—

Figure 1 is a vertical sectional view of a container illustrating one form of freezing device and illustrating a centrally disposed vertical cross-wall for acceleration of heat transmission and showing the progress of freezing a comestible and the point of final solidification at each side of the wall;

Figure 2 is a cross-sectional view taken on line 2—2 of Figure 1 showing the cross wall contacting the cylindrical side wall of the container;

Figure 3 is a horizontal sectional view of a freezing container with another form of device for accelerating heat transmission that provides three final points of solidification and formed as an integral part of the container.

Figure 4 is a cross-sectional view of another form of container with another form of heat transmission device contacting the side and bottom walls of the container and providing four final points of solidification;

Figure 5 is a cross-sectional view of another form of container wherein the heat transmission device is on the form of a cross wall contacting the sides and bottom of the container with relatively short walls radiating from the cross wall at opposite sides thereof providing four final points of solidification; and Figure 6 is a horizontal sectional view of a container with another form of heat transmission device.

It will be further noted that all forms of the invention disclosed and shown in drawing, Figures 1 to 6 inclusive embody a method and means for accelerating heat transmission from the exterior surfaces of frozen comestibles and the like into the interior of the frozen mass as required to expedite the defrosting of frozen comestibles by the consumer. In this connection, it is known that hot water and similar means of rapid defrosting causes injury to the quality and appearance of many comestibles.

In heat treating comestibles and the like such as heating, sterilizing and cooking, it will be noted that all forms of the invention disclosed and shown in drawing embody a method and means for acelerating heat transmission resulting in a more rapid treatment, improved quality and more economical operation.

In cold packing comestibles such as berries and the like in barrels or large containers it will be noted that the forms of the invention disclosed and shown in the drawing embody a method and device for rapidly removing heat from the center of the container as required to prevent fermentation, spoilage and concentration of sugar syrup at this point also as needed to eliminate the necessity of precooling the comestible before packing which is not economical and is impractical where the comestible is packed at a packing plant before being shipped to cold storage.

The container and heat transmission element illustrated in Figures 1 and 2 comprises a substantial container 10 constructed of wood, metal, paper board, vegetable parchment, "Cellophane", "Visking", metal foil or any suitable material capable of withstanding or immune to erosion or other undesirable effects of the heat transferring vehicle which will be applied on the external surfaces of the container. An element 11 for accelerating heat transmission preferably in the form of a flat wall contacts two sides and the bottom of the container and is preferably constructed of aluminum, tin or any material having a higher heat transfer coefficient than the substance 12 being treated. The heat transmission element 11 is constructed for placement within the freezing container and is also utilized to expedite the defrosting of the frozen comestible by the consumer. In the process of freezing, the core 13 or final points of solidification occur at two points in the container 10 as shown and are separated by the element plus the accumulation of solidified substance 12 on the surfaces of the device resulting in less concentrated substance, faster freezing, more uniform appearance and saving in costs of operation. The container 10 is provided with end walls 10a connected thereto by an ordinary can seam and the side wall of the container embodies the usual side seam 14.

The container as shown in Figure 3 is of the same general design as illustrated in Figures 1 and 2, being preferably of cylindrical formation, although the same may assume any configuration desired. The container 10a and heat transmission element 15 are of integral construction, the wall 15 constituting the heat transmission element, and the formation thereof including an intermediate arcuate portion 16 folded onto itself as at 17 and an opposed arcuate portion 18. One outer edge of the wall 15 is bent to form a seam 15a that merges into the side wall 10a and the free edge of the side wall is retained in the seam. The free edges of the arcuate portions 16—17 terminate in spaced relation to one side of the wall 15 adjacent the center thereof as at 19. This construction of heat transmission element provides a central final solidification point 20 and lateral final solidification points 21 intermediate the walls of the container 10a and the heat transmission element. The lateral final solidification points 21 follow a curved line incident to the curvature of the wall of the container and the portions 16 and 17 of the heat transmission element, such final solidification points being graphically illustrated.

The container illustrated in Figure 4 and designated by the reference character 10b is of the same general configuration as the previous forms of the invention, the side wall of the container being joined by a seam 14b, embodies a heat transmission element 22 in the form of a wall contacting the sides and bottom wall of the container 10b with opposite sides bent upon itself as at 22a for a distance terminating laterally of the center of the wall and then angularly directed outwardly to provide a heat transmission fin 23 in the form of a flat wall extending from the wall 22 to the side wall of the container 10b and deviating from a radial line with the two fins 23 preferably arranged in parallel planes. This arrangement provides four cores 24 or final points of solidification. This arrangement of freezing device develops a desirable formation of solidified substances 12b on the heat transferring surfaces and also causes the cores or final points of solidifications 24 to occur at four different points, all of which has been found exceptionally desirable in treating certain comestibles.

In the form of invention illustrated in Figure 5, the container 10c includes the side seam 14c and has a heat transmission wall 25 contacting the sides and bottom of the container 10c and a lateral fin 26 extending from each side of the wall 25 and terminating in spaced relations to the side wall of the container 10c, although it is to be understood that these fins 26 may be extended for contact with the side wall of the container if desired. The wall 25 and fins 26 are formed from a single sheet of material bent upon itself as illustrated. This arrangement of wall and fins provides four final points of solidification as at 27 for the more rapid freezing of the comestibles 12c, and is found to be especially desirable in the treatment of certain comestibles.

In the several forms of the invention heretofore described, the heat transmission elements have been illustrated as being formed of a single piece of material, but it is to be understood that such heat transfer elements may be formed of two or more separate units. As illustrated in Figure 6, the container 10d has a removable heat transfer element therein in the form of a pair of walls 28, each bent at right angles with the angle portions contacting at the center of the container as at 29 and contacting the sides and bottom walls of the container. This arrangement of heat transfer elements provides four final solidification points 30 for the comestible being frozen.

It is obvious from the disclosure that the invention embodies a method of accelerating heat transmission from or to the interior of comestibles or the like for the purpose of treating such substance and simple, economical and efficient devices to accomplish the acceleration of heat transmission, and while there are herein shown and described the preferred embodiments of the present invention, it is nevertheless to be understood that minor changes may be made therein without departing from the spirit and scope of the invention as claimed.

I claim:—

In the rapid freezing of comestibles, a hermetically sealed container for commercial use adapted to be externally subjected to a heat transferring vehicle, a heat transmission element in the container including a plate having its ends in contact with the walls of the container and extending across the container at the approximate center thereof to multiply the final points of solidification, and fins carried by the plate and extending towards the walls of the container and terminating in spaced relation to the walls of the container.

WILLIAM J. FINNEGAN.